Jan. 10, 1967 J. D. KLINK ETAL 3,297,420
CHARCOAL FIRE KINDLER
Filed Sept. 27, 1962
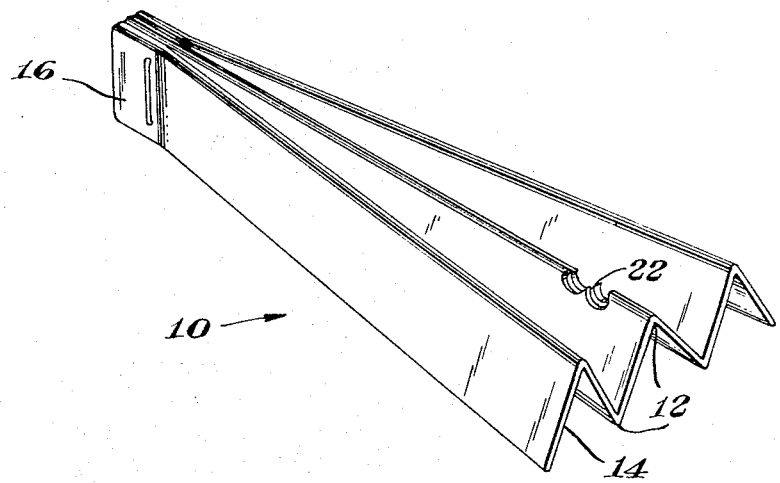
Fig. 1
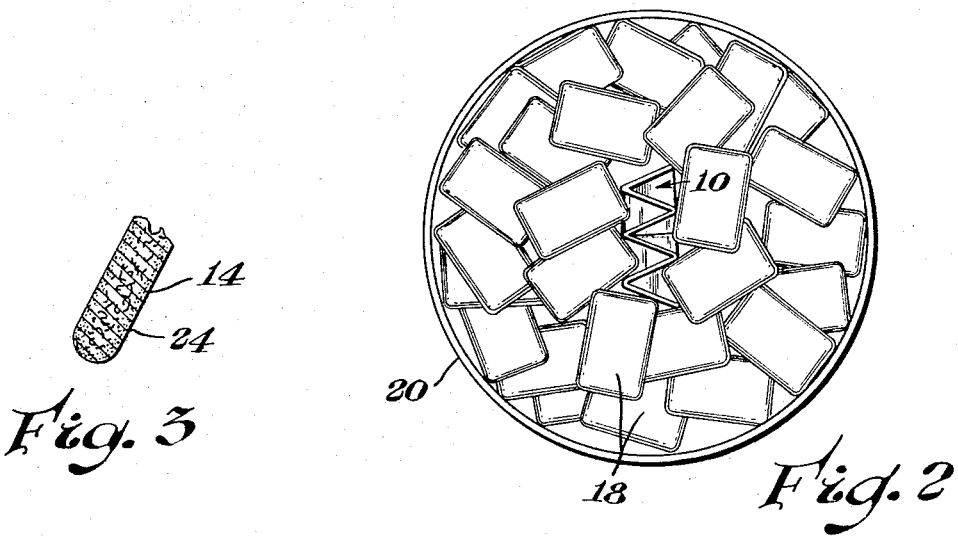
Fig. 3
Fig. 2
INVENTORS.
John D. Klink
Arthur W. Goos
BY Earl D. Ayers
AGENT

United States Patent Office 3,297,420
Patented Jan. 10, 1967

3,297,420
CHARCOAL FIRE KINDLER
John D. Klink and Arthur W. Goos, Marquette, Mich., assignors to Cliffs Dow Chemical Company, Marquette, Mich., a corporation of Michigan
Filed Sept. 27, 1962, Ser. No. 226,541
5 Claims. (Cl. 44—34)

This is a continuation-in-part of applicants' copending application Serial No. 42,673, filed July 13, 1960, entitled "Charcoal Fire Kindler," and now abandoned.

This invention relates to a charcoal fire kindler or lighter and to a method of using it.

Numerous types of fire kindlers have been suggested for starting fires. None of the heretofore known kindlers have been entirely satisfactory for starting a charcoal briquet or lump fire such as the type used in a household grill for grilling a steak, for example. The most common method of starting a charcoal fire for "cook out" or other purposes is to pour a kereosene-type charcoal lighter fluid onto a pile of charcoal until it becomes more or less saturated with the liquid, and then to light the fluid. The burning of the flammable fluid which saturates the charcoal eventually ignites the briquets or lumps. The fluid burns readily as long as there is sufficient amount of the fluid to coat the charcoal. However, after an appreciable portion of the fluid is burned, generally smoking and smoldering occurs. Also, when the charcoal is sprayed with the flammable liquid, some of the liquid is absorbed by the charcoal which continues to distill off during their use as in cooking food. The flammable liquid so vaporized may impart unpleasant odors and taste to the food.

Crumpled paper is commonly used to start charcoal fires. It is placed under a pile of charcoal and lighted with a match. Because the cold charcoal lumps or briquets contact the paper at many points, the paper will not burn cleanly at these points but will smolder and smoke. Particularly the paper under the charcoal will smolder until the entire mass becomes glowing. Depending on the paper and the arrangement with the charcoal, the paper may flame briefly and go out without igniting the charcoal. At best this method of lighting a charcoal fire is unpredictable.

A simple kindler for a charcoal briquet fire for cooking purposes is greatly desired. The kindler should not be hazardous to store or use, should be convenient to use and easy to light and once lit it must not go out until after the charcoal has been ignited. It should burn readily without smoldering and without the emission of undesirable odors or fumes which will adversely affect the flavor or edibility of the food. In addition to having the other properties above, the kindler should be economical to use.

Therefore, it is an object of this invention to provide a fire kindler for charcoal briquets or lump charcoal used for grilling which will meet the requirements set forth above. A further object is to provide a method for using this kindler such that the charcoal may be easily and readily ignited.

The above and other objects are attained by having a fire kindler for charcoal which comprises a sheet cellulose pulp material having a thickness of about 0.025 inch folded in alternating folds of a width in the range from ⅜ to ¾ of the average width of the briquets or lumps. The folds of the sheet cellulose pulp are compressed together and stapled at one end and expanded at the other to form a wedge-shaped body. The sheet cellulose pulp is impregnated, but not saturated with paraffin wax. A lighting aperture is disposed in the sheet in the central flared part of the kindler near the wide end of the device. In using the kindler a number of briquets or lumps of charcoal are confined in a relatively small area and the kindler is inserted into the pile of charcoal from the top, forcing the compressed and stapled end of the kindler into the body of charcoal until the expanded or flared top of the kindler remains exposed a little way above the top of the pile. The kindler is then ignited at the ignition aperture which is near the top of the device. When the kindler is inserted into the center of the pile, corrugations or the folds provide air spaces so that air will be supplied to the kindler until it is totally burned. The corrugations not only provide a means of supplying oxygen or air to the kindler, but also prevent smoking and smoldering of the kindler due to the kindler being cooled to below its ignition temperature. The briquets or lumps touch the kindler only at the folded edges so that the contact is not sufficient to draw heat away from the kindler at a rate which cools it sufficiently to keep it from burning. Thus, with this kindler, starting of a charcoal fire is simple, safe, and effective. The charcoal may be emptied into a pile or into a holder and the kindler inserted into the pile. The kindler is adapted to be lighted at the ignition aperture with a single match. The ignition aperture is disposed about ¼ inch below the top of the kindler and in the center part. With care, it is not necessary to touch or handle the charcoal when the kindler is inserted or ignited. After the kindler has burned completely, a glowing core of red hot charcoal is found to be present near the center of the pile. The fire then readily spreads uniformly throughout the pile in about 10 to 20 minutes. The briquets or lumps so ignited can then be arranged as desired. The kindler, its method of operation, and its objects and advantages may be more easily understood when the following description is considered in conjunction with the following drawing in which:

FIGURE 1 shows an isometric view of the kindler;

FIGURE 2 shows the kindler inserted into a pile of charcoal briquets to be ignited; and FIGURE 3 is a fragmentary transverse sectional view of one pleat of the kindler.

As can be seen in FIGURE 1, the kindler 10 is of a corrugated type construction and wedge shaped. The kindler is made by pleating or alternately folding a sheet of cellulose sheet pulp to obtain a corrugated or pleated structure having relatively sharp folds or edges 12. The folds or pleats 14 at the base or insertion end 16 are compressed and fastened together, as shown, as by stapling, for example, to give the wedge shape.

The sheet cellulose pulp referred to above is a product which is made for repulping to make finished paper. "Cellate" brand sheet pulp, obtainable in 26" x 35" rough sheets in bales, is a bleached kraft sheet pulp material (not a paper) which has proven very satisfactory for use in this invention. The long fiber length, moderate compression and thickness (about 0.025 inch) has been found to give substantially improved results.

Referring to FIGURE 3, as well as to FIGURES 1 and 2, the sheet cellulose material is impregnated with a paraffin type wax 24, but not to saturation, which adds water resistance to the kindler, and helps to maintain a springiness, strength, and burning qualities even after the kindler has been exposed to high humidity conditions.

As may be seen in FIGURE 3, the wax 24 (stippled area) does not extend completely through the pleat.

The wax which is usually used, in connection with this invention, is "Mobile D-30" a wax which is commonly used in impregnating the paper used in making milk cartons.

The approximate weight of a preferred embodiment of finished kindler is 7.5 grams, of which 2.0 grams is paraffin wax, when the kindler is composed of a sheet of cellulose pulp measuring 4½ inches by 4½ inches and about 0.025 inch thick. In practice, the weight of the paraffin wax is between 30 percent and 40 percent of the weight of the cellulose pulp material, with about 35 percent being the preferred amount of wax (expressed in percent of the weight of the paper).

In using the kindler, charcoal may be emptied from the sack into a pile or confined to an area of around 6 to 12 inches in diameter and about 3 to 4 inches high as in a holder. After the charcoal has been thus confined, the kindler may be inserted into the pile by slightly twisting while forcing the end 16, which is fastened together, into the pile. By slightly twisting the kindler, the charcoal becomes rearranged, allowing the kindler to be inserted.

FIGURE 2 shows the kindler 10 inserted into a pile of briquets and ready for lighting. The briquets 18 are confined to a relatively small area by use of a briquet holder 20 which may be an open ended cylindrical wall having air circulation means in the walls. The wall may be made of expanded metal or of mesh material, for example.

To obtain a kindler which will burn readily once lit, it is essential that the folds or corrugations of the kindler have a definite ratio to the size of the charcoal lumps or briquets used. The folds or corrugations should be such that they are approximately ⅜ to ¾ of the average width of the lumps or briquets. The corrugations serve three purposes. The first is to provide air access to the kindler and the second is to restrict the contact area of the kindler with the charcoal. The third is to help provide rigidity to the structure. When the folds are of a width of from around ⅜ to ¾ of the average width dimension of the charcoal to be ignited by the kindler, the corrugations are such that sufficient air is obtained and the kindler is contacting the charcoal at the edges of the folds at a number of points which are not sufficient to extinguish the kindler. With folds of less ⅜ of the width dimension of the charcoal, the burning of kindler is hindered by lack of air and too large of a contact with the charcoal. Folds larger than ¾ of the size of the charcoal generally do not have required rigidity and allow some of the charcoal to get in between the folds increasing the contact area. Since most of the charcoal briquets used for grilling are of a uniform size and have overall width dimensions in the range of from 1 to 2½ inches, the width of the folds generally used in the kindler is from ⅜ to 1 inch wide. The preferred size fold is ¾ inch. A kindler having the same size folds is also used for the lump charcoal. The shape of the lumps may be irregular and the overall dimensions may vary from ½ up to 4 to 5 inches. However, the average overall width dimensions of the lumps is in the range of 1 to 2½ inches.

In FIGURES 1 and 2, the kindler shown has six folds, although other than six folds may be used. Generally, at the expanded end the folds or pleats are parted so that the distance between the edges of the folds in the same plane are about equal to or slightly greater than the width of the folds. Also it is desirable to have the kindler form a wedge which does not have an angle at the apex greater than 60 degrees. A kindler having from 4 to 8 folds readily meets these requirements.

The length of the kindler is not sharply critical but a sufficient amount of the kindler must be embedded in the pile to provide a required burning time of from 3 to 6 minutes. If burning time is less than 3 minutes, the time is not sufficient for adequate ignition of the charcoal to take place. However, excessive burning time is also undesirable because the glowing of the charcoal, once ignited, depletes the oxygen available to the kindler and smoldering of the kindler may result. Also, after the charcoal is sufficiently ignited, the presence of the kindler, if not burned, will restrict the passage of air by natural convection through the hot glowing core of charcoal requiring a longer time for the burning of the core to spread to the other lumps or briquets. Generally, the kindlers are made in a length of from 4 to 6 inches, preferably about 4½ inches, and when they are inserted into the bed of briquets 1 to 2 inches may be projecting above the top of the briquets. This allows for easy lighting and also enables the kindler to be so placed without having to touch the briquets.

About 40 charcoal grilling briquets having dimensions of 1¾ x 1¾ x 1⅛ inches were dumped from a bag into a cylindrical holder approximately 6½ inches in diameter and 3¾ inches high. The holder was used to form the pile and hold the briquets together during the lighting procedure. The wedge shaped kindler was inserted into the pile of the briquets from the top by forcing the apex or stapled end 16 of the kindler into the body of the briquets while slightly twisting it. In this manner the kindler was inserted into the pile of briquets 18 to a depth of approximately 3 inches, leaving about 1½ inch of the kindler above the briquets. The kindler was lit at the ignition aperture 22 with a match and it burned smoothly from the top part down for approximately 5 minutes until it was totally burned. The ignition aperture 22 preferably presents pointed edges to the match in order to make ignition easier. By the time the kindler was completely burned, there was a glowing core of red hot briquets in the center of the pile. These briquets were allowed to remain in the holder for approximately 20 minutes by which time the fire had uniformly spread throughout the pile. At that time, the holder 20 was removed and the briquets were spread out and made ready for use as a cooking fire.

It is apparent from the specification that the described kindler and its method of use greatly simplifies starting a charcoal fire. There is a minimum of smoldering, smoke and objectionable fumes during its use. The kindlers are non-toxic and completely non-hazardous in storage. They are convenient to use and are most reliable in promoting a glowing mass of fuel, which, in a short time, is suitable for cooking. Further, the paraffin coating on the kindler provides a substantial degree of protection against the kindler becoming too damp to burn properly when the kindler has been stored under very humid conditions.

What is claimed is:

1. A fire kindler for charcoal lumps and briquets which comprises sheet cellulose pulp material about 0.025 inch thick folded in alternating pleats each having a width of about ¾ inch, there being approximately 6 pleats, said pleats being about 4½ inches long and being compressed and secured together at one end and expanded at the other end to form a wedge shaped body including a flared upper part, said sheet cellulose material being impregnated with paraffin wax to a degree which is less than saturation.

2. A kindler in accordance with claim 1, wherein said kindler has an ignition aperture which extends through said sheet cellulose pulp material.

3. A kindler in accordance with claim 2, wherein the spacing between the upper end of said kindler and the nearest edge of said ignition aperture is between ¼ and ½ inch and said ignition aperture is centrally disposed in said flared upper part.

4. A kindler in accordance with claim 1, wherein the weight of the paraffin wax of said kindler comprises between 30 percent and 40 percent of the weight of said sheet cellulose material.

5. A kindler in accordance with claim 1, wherein substantially all of the paraffin wax is dispersed within said sheet cellulose pulp material.

References Cited by the Examiner

UNITED STATES PATENTS

| | | | |
|---|---|---|---|
| 1,113,478 | 10/1914 | Philips | 44—40 |
| 2,094,661 | 10/1937 | Macleay et al. | 44—41 |
| 2,811,428 | 10/1957 | Smith | 44—41 |
| 3,010,809 | 11/1961 | Peck | 44—40 |
| 3,031,277 | 4/1962 | Strauss | 44—40 |

FOREIGN PATENTS

| | | |
|---|---|---|
| 10,519 | 12/1911 | Great Britain. |
| 363,729 | 12/1931 | Great Britain. |
| 429,683 | 6/1935 | Great Britain. |
| 508,000 | 6/1939 | Great Britain. |

DANIEL E. WYMAN, *Primary Examiner.*

C. F. DEES, *Assistant Examiner.*